1,516,397

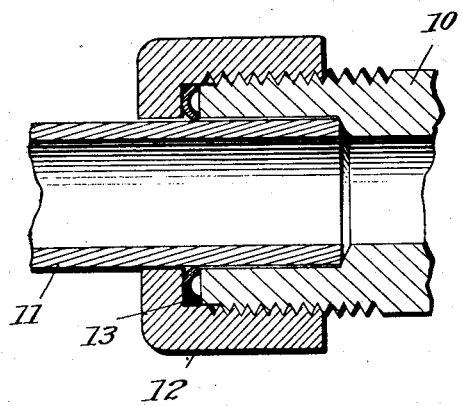
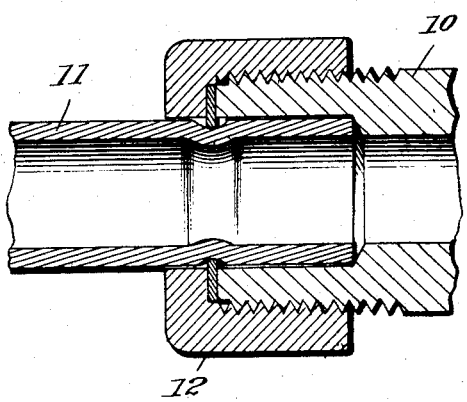
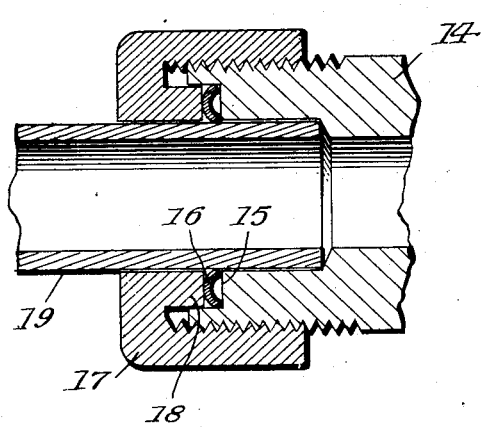
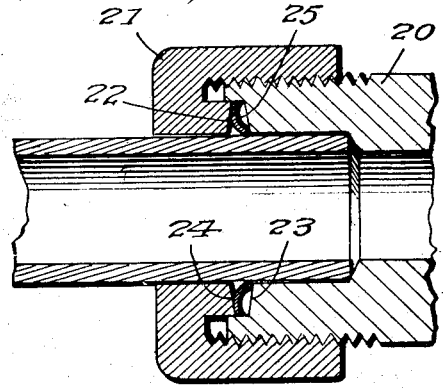
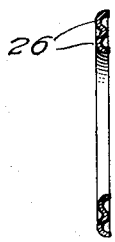
Inventor
PHILIP MUELLER,
ANTON C. SCHUERMANN, Patented Nov. 18, 1924.

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

COMPRESSION COUPLING.

Application filed January 27, 1920. Serial No. 354,504.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Compression Couplings, of which the following is a specification.

The present invention relates to couplings, and particularly that type known as compression couplings.

It has for its object to provide a coupling in which a fluid-tight joint may be employed without the use of fibrous or other packing, the arrangement being such that by utilizing metallic members, a locked and fluid-tight joint will be secured and the necessity of utilizing special packings and the annoyance of assembling such special packings will be avoided.

The form of the invention herein disclosed contemplates the use of a particular type of compression member which is shown in connection with a very common and usual type of telescoping coupling, but it is obvious that the invention is adaptable to various types of couplings, and that its form may be varied within a very large range without departing from the spirit of our invention.

In order that the invention may be clear to those skilled in the art, we have shown it in the accompanying drawings in several partial embodiments, which are merely illustrative, but in no sense restrictive of the coupling.

In said drawings:

Figure 1 is a sectional view of a coupling assembled, ready for setting up.

Figure 2 is a view of the same coupling after it is set up or drawn together.

Figure 3 is a sectional view of an assembled coupling of slightly different construction.

Figure 4 is a sectional view showing a slightly different form of compression member.

Figures 5, 6 and 7, are sectional views of different forms of compression members.

Referring to the drawings by numerals, like numbers indicate like parts in the several views, 10 indicating the outer pipe or telescope member which in the present instance is illustrated as the shank of a faucet. Telescoping the said member 10 is the inner telescoping member or pipe 11 which for the purposes of illustration is the outer service pipe for a faucet.

The member 10 is threaded to receive a coupling member 12 which in the present showing is a coupling nut, the said member 12 being apertured so as to slide freely on the member 11.

Between the opposed end walls of the nut 12 and the faucet shank 10 is located a compression member 13 which in the present instance is shown as a washer-like formation adapted to slip readily over the pipe 11 and which has its body curved in cross-section as shown.

With the parts assembled as shown in Figure 1, the compression member 13 lies between the end walls of the nut 12 and the shank 10. When the nut 12 is turned up on the threaded shank, the compression member 13 will be flattened and its peripheries radially projected so as to take the form shown in Figure 2 of the drawings and since it is confined by the circumferential wall of the nut 12 it will be prevented from expanding outwardly and will be forced inwardly in a radial direction against the wall of the pipe 11, the resistance of which is less than that of the heavier nut and will indent the wall of the pipe circumferentially as shown, locking the parts firmly together and making also a fluid-tight joint.

In the form of the invention shown in Figure 3, the end of the shank or outer telescoped member 14 is counterbored as at 15 to form a recess to receive the compression member 16. The nut or coupling member 17 will be provided with an annular projection 18 to enter the recess 15 and compress the compression member 16. The action of the compression member in this form will be identical with that described in connection with the construction shown in Figures 1 and 2, the compression member 16 being flattened and forced into the wall of the telescoping member 19, in identically the same manner so as to give a locked end fluid-tight joint.

In the form of the invention shown in Figure 4, the member 20 is recessed as in Figure 3, and the member 21 has the projection 22 to enter said recess. The opposed walls 23 and 24, of the recess and projection are, however, inclined, flaring inwardly in a radial direction as shown and the compression member 25 is of slightly different curvature in cross-section from the form shown in Figure 3. In action, the flattening of the ring is similar to that described in connection with the other views, the inclined walls of the opposed faces tending to cause the metal of the compression member to flow inwardly in a radial direction as the compression is from the outer periphery of the inclined walls inwardly.

It is obvious that these compression members may take a variety of forms in cross-section and several examples of such compression rings are shown in Figures 5, 6 and 7.

For example, as in Figure 5, the ring may have a plurality of curved sections 26 adjacent one another. As shown in Figure 6, the shape of the ring in cross-section may be angular as at 27.

In Figure 7, a ring is shown having a plurality of sections 28 angular in cross-section and arranged adjacent one another.

These compression members may be very quickly and readily formed by punching and stamping from suitable metal and without material change the coupling members themselves are readily adapted for use with such compression members.

The coupling has the advantage, of course, that it gives without the use of fibrous or other packing, a fluid-tight joint and furthermore, the joint is locked by the indenting action of the compression member. The parts being of metal are of course, of long life and deterioration of the joint by reason of wearing out or disintegration of the packing after a long period is eliminated.

It will be understood that such variations in construction as are within the skill of the mechanic and such adaptations to joints other than those herein shown as are clearly obvious may be made without departing from our invention.

We claim:

1. In a compression coupling, the combination of two telescoping members, a coupling member engaging one of said members, and a compression member of relatively thin material the body of which is bent in cross-section between said coupling and engaged members, said compression member being adapted to be flattened and forced radially against the other of said telescoping members when the engaged members are drawn together.

2. In a compression coupling, the combination of an outer pipe, an inner pipe telescoping said outer pipe, a coupling member engaging said outer pipe, and a compression member of relatively thin material the body of which is bent in cross-section between the opposed end walls of said coupling member and said outer pipe, said compression member being adapted to be flattened and forced radially against the inner telescoping pipe when the coupling member and outer telescoped pipe are drawn together.

3. In a compression coupling, the combination of an outer pipe having an inclined end wall, an inner pipe telescoping said outer pipe, a nut threaded to said outer pipe and having an inclined inner wall, and a compression member of relatively thin material the body of which is bent in cross-section between the inclined walls of said coupling and pipe, said compression member being adapted to be flattened and forced radially against the inner telescoping pipe when the coupling nut and outer pipe are drawn together.

4. In a compression coupling, the combination of an outer pipe, an inner pipe telescoping said outer pipe, a coupling member engaging said outer pipe, a compression member of relatively thin material the body of which is bent in cross section between the opposed end walls of said coupling member and said outer pipe, said compression member being adapted to be flattened and forced radially against the inner telescoping pipe when the coupling member and outer telescoping pipe are drawn together, and means to prevent outward expansion of said compression member when it is flattened.

5. In a compression coupling, the combination of an outer pipe having a recess in its outer end, an inner pipe telescoping said outer pipe, a coupling nut threaded to said outer pipe and having an inner projection to engage the recess in the end wall of said outer pipe, and a compression member of relatively thin material the body of which is bent in cross-section in the recess in the end wall of said outer pipe, said compression member being adapted to be flattened and forced radially against the inner telescoping pipe when the coupling nut and outer pipe are drawn together.

6. A compression member adapted to engage and interlock compression couplings by the radial projection of its periphery, formed of relatively thin material and having its body bent in cross-section so as to expand radially under pressure.

7. A compression member adapted to engage and interlock compression couplings by an inward radial projection of its periphery, formed of relatively thin material and having its body bent in cross-section so as to expand inwardly under pressure.

8. In a compression coupling the combination of two telescoping members, a coupling engaging one of said members, a compression member having its body normally curved in cross section and adapted to be forced radially into indenting engagement with the other of said telescoping members when the engaged members are drawn together.

9. A compression member for compression couplings formed of yieldable material and having its body normally curved in cross section so that its edges will be expanded radially into an indenting position when the coupling is set up.

In testimony whereof we have hereunto set our hands.

PHILIP MUELLER.
ANTON C. SCHUERMANN.